(12) United States Patent
Rudelic

(10) Patent No.: US 7,411,821 B2
(45) Date of Patent: Aug. 12, 2008

(54) METHOD AND APPARATUS TO PROTECT NONVOLATILE MEMORY FROM VIRUSES

(75) Inventor: John C. Rudelic, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 117 days.

(21) Appl. No.: 11/390,948

(22) Filed: Mar. 27, 2006

(65) Prior Publication Data

US 2007/0247905 A1    Oct. 25, 2007

(51) Int. Cl.
*G11C 11/34* (2006.01)

(52) U.S. Cl. .......................... 365/185.04; 365/185.18; 365/185.11

(58) Field of Classification Search ............ 365/185.04, 365/185.18, 185.11
See application file for complete search history.

(56) References Cited

U.S. PATENT DOCUMENTS 6,026,016 A * 2/2000 Gafken ................. 365/185.04
7,085,158 B2 * 8/2006 Jeon et al. .............. 365/185.04

* cited by examiner

*Primary Examiner*—Huan Hoang
(74) *Attorney, Agent, or Firm*—Kacvinsky LLC

(57) ABSTRACT

An apparatus, system, method, and article for protecting nonvolatile memory from viruses are described. The apparatus may include a nonvolatile memory comprising one or more protected storage areas. The nonvolatile memory may be arranged to transform buffered information to be programmed in the protected areas and to program transformed information in the protected storage areas. Other embodiments are described and claimed.

16 Claims, 5 Drawing Sheets

METHOD AND APPARATUS TO PROTECT NONVOLATILE MEMORY FROM VIRUSES

BACKGROUND

Nonvolatile memory, such as flash memory, is capable of retaining digital information until the memory is erased. Due to its high reliability, density, and speed, as well as its low cost and power consumption, flash memory is well-positioned to meet the increasing performance requirements of the wireless device industry.

Security for nonvolatile memory is an important consideration as wireless devices such as mobile telephones and handheld computers adopt color screens, cameras, Web browsing, video, and music capabilities as standard features. In particular, it is important to provide security measures for protecting nonvolatile memory from infection by computer viruses to prevent corruption and/or loss of data files and operational code. Therefore, there is a need for systems and techniques to provide improved virus protection for nonvolatile memory.

DETAILED DESCRIPTION

Various embodiments are directed to protecting nonvolatile memory, such as flash memory. In one embodiment, for example, a nonvolatile memory may comprise one or more protected storage areas, such as one more protected nonvolatile memory blocks of a nonvolatile memory array. The nonvolatile memory may be arranged to transform information that is to be programmed in the protected storage areas and to program transformed information in the protected storage areas.

In various implementations, the nonvolatile memory may be arranged to buffer information into a program buffer and to perform a transformation operation, such as a one-way decryption operation, on buffered information that is to be programmed in the protected storage areas. If the information was encrypted appropriately prior to being buffered into the program buffer, the transformed information to be programmed may include correct information. As such, subsequently reading the protected storage areas will obtain the correct information. If the information buffered into the program buffer includes clear data and/or improperly encrypted data from a virus, for example, the transformed information to be programmed may include scrambled, jumbled, unintelligible, and/or meaningless information. Accordingly, the various embodiments may provide protection against malicious attempts by a virus to modify the nonvolatile memory.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Figure 1:
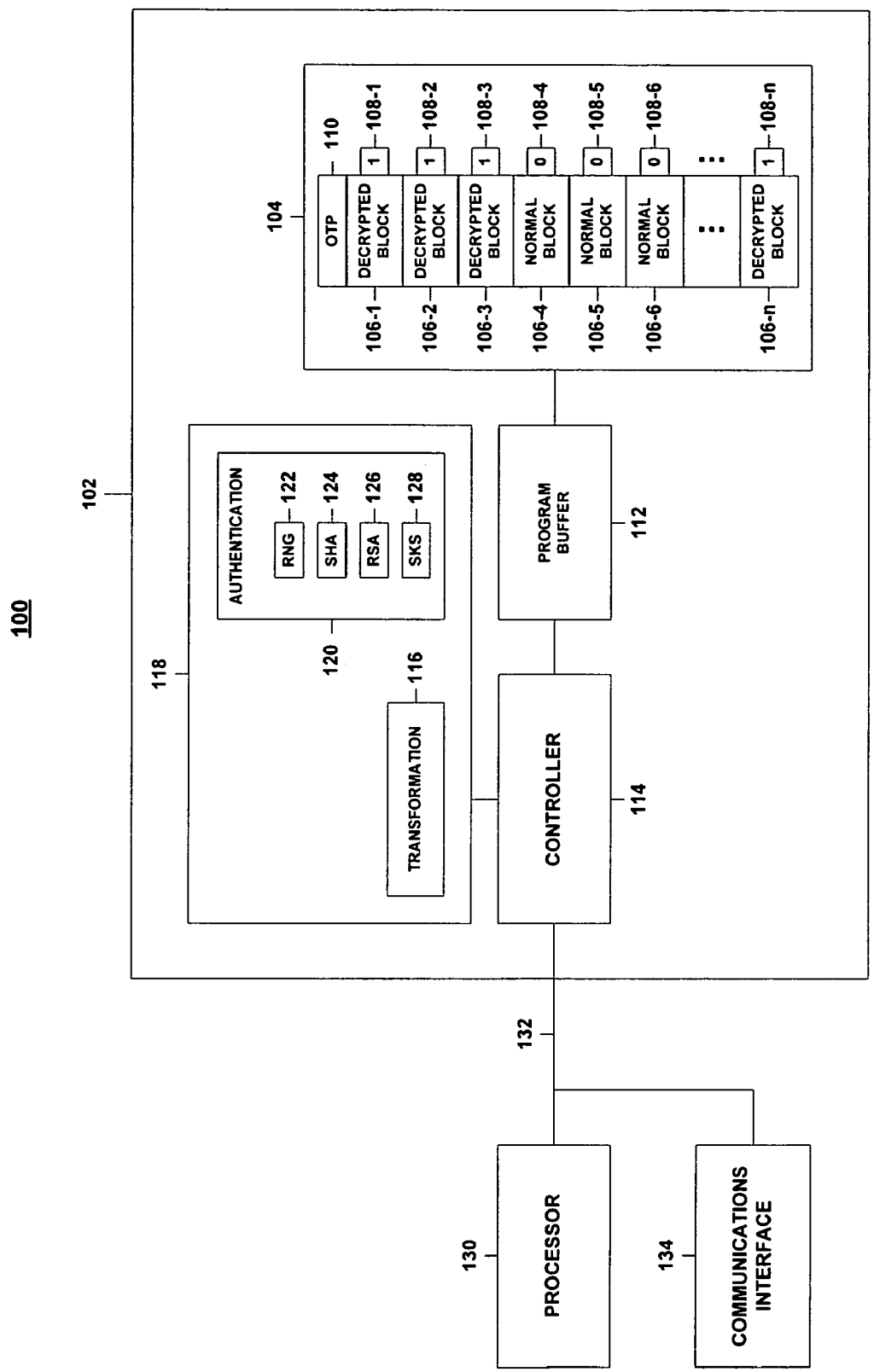
FIG. 1 illustrates one embodiment of a computing system.

FIG. 1 illustrates a block diagram of one embodiment of a computing system 100. The computing system 100 generally may comprise various physical or logical components implemented as hardware, software, or any combination thereof, as desired for a given set of design parameters or performance constraints.

In various embodiments, the computing system 100 may comprise or be implemented by a wireless device such as a mobile telephone, a handheld computer, a personal digital assistant (PDA), a combination mobile telephone/PDA, a smartphone, a handset, a one-way pager, a two-way pager, a data transmission device, a wireless access point, a base station (BS), a subscriber station (SS), a mobile subscriber center (MSC), a radio network controller (RNC), and so forth. In such embodiments, the computing system 100 may comprise one more interfaces and/or components for wireless communication, such as one or more antennas, transmitters, receivers, transceivers, amplifiers, filters, control logic, and so forth.

Although some embodiments may be described with the computing system 100 implemented as a wireless device by way of example, it may be appreciated that the embodiments are not limited in this context. For example, in some embodiments, the computing system 100 may comprise, or be implemented as a personal computer (PC), a desktop computer, a laptop computer, a notebook PC, a workstation, a terminal, a server, an appliance, a PDA, a digital music player, a set-top box (STB), or other type of computer system or sub-system.

As shown, the computing system 100 may comprise a nonvolatile memory 102. The nonvolatile memory 102 may comprise, for example, one or more chips or integrated circuits (ICs). In various embodiments, the nonvolatile 102 may be implemented by flash memory, such as NOR or NAND flash memory. Examples of flash memory include, for example, Intel® Flash Memory products, such as StrataFlash® Cellular Memory and Intel® Wireless Flash Memory, and other types of flash memory. It can be appreciated that although some embodiments may be described with the nonvolatile memory 102 implemented by flash memory, the embodiments are not limited in this context. For example, in some embodiments, the nonvolatile memory 102 may be implemented by polymer memory, ferroelectric memory, magnetic memory, or other nonvolatile storage medium.

The nonvolatile memory 102 may be arranged to store various types of information such as data, instructions, and code. The information may include, for example, image information (e.g., digital photographs, user interfaces, Web pages, graphics), audio information (e.g., music, sounds, ring tones), video information, audio/video (A/V) information (e.g., video files, video clips, movies, broadcast programming), voice information, textual information (e.g., encryption keys, serial numbers, e-mail messages, text messages, instant messages, contact lists, telephone numbers, task lists, calendar entries, hyperlinks), numerical information, alphanumeric information, character symbols, and so forth. The information may include command information, control information, routing information, processing information, system file information, system library information, software (e.g., operating system software, file system software, application software, game software), firmware, an application programming interface (API), a program, an applet, a subroutine, an instruction set, an instruction, computing code, logic, words, values, symbols, and so forth. In various embodiments, instructions and/or code may be stored contiguously in the nonvolatile memory 102 to allow the instructions and/or code to be executed-in-place (XIP). The embodiments are not limited in this context.

The information stored by the nonvolatile memory 102 may comprise static and/or dynamic information. Static information may comprise any information that may not be altered, changed or updated. Examples of static information may include read-only data, instructions, and code. Dynamic information may comprise any information that may be altered, changed, and/or updated. Examples of dynamic information may include read/write data, instructions, and code. The embodiments are not limited in this context.

In various embodiments, the nonvolatile memory 102 may be arranged to store information in a file system including one or more nonvolatile memory arrays, such as nonvolatile memory array 104. The nonvolatile memory array 104 may be implemented, for example, by an array of floating gate transistors or nonvolatile memory cells (e.g., flash memory cells). The nonvolatile memory cells may comprise single-bit cells that allow one bit of information to be stored in each cell and/or multi-level cells that allow more than one bit of information to be stored in each cell. For example, two bits of information may be stored in a multi-level cell by controlling programming and reading in order to have four states within a single transistor.

As shown, the memory array 104 may include a plurality of nonvolatile memory blocks, such as nonvolatile memory blocks 106-1-$n$, where n represents a positive integer value. Each of the nonvolatile memory blocks 106-1-$n$ may comprise, for example, a plurality of memory cells capable of storing at least one bit of information. In various implementations, the memory array 104 may be arranged to have a symmetrical or asymmetrical blocking architecture. For example, the memory array 104 may comprise a symmetrically-blocked array with each memory block having a size of 256 kilobytes (KB).

In various embodiments, the memory blocks 106-1-$n$ may be grouped into partitions (e.g., 16 or 32 memory blocks per partition) and/or may be divided into regions (e.g., 256 one-kilobyte memory regions per memory block) within the memory array 104. In some implementations, the nonvolatile memory 102 may be arranged to store data and code in separate partitions.

In various implementations, regions may be programmed in one or more modes, such as in an object mode or a control mode. An object mode programming region may comprise, for example, a one-time write or write-restricted memory region for storing static information, such as objects or payloads that rarely change. A control mode programming region may comprise, for example, a rewritable memory region that supports multiple programming operations for writing, erasing, rewriting, over-writing, augmenting, altering, changing, and/or updating dynamic information. In some cases, the full data storage capacity (e.g., 1 KB) of a programming region may be available for data storage. In other cases, less than the full data storage capacity (e.g., 512 bytes) of a programming region may be available for data storage.

In various embodiments, the nonvolatile memory 102 may include features to provide protection against malicious attempts by a virus to modify the nonvolatile memory 102. For example, a virus may exploit a browser vulnerability and attempt to program malicious information the nonvolatile memory 102. Such features to protect the nonvolatile memory 102 may comprise, or be implemented by, hardware, software, and/or any combination thereof, as desired for a given set of design parameters or performance constraints.

The nonvolatile memory 102 may comprise one or more protected storage areas. In one embodiment, the protected storage areas may comprise one or more nonvolatile memory blocks 106-1-$n$ of the nonvolatile memory array 104. As shown in FIG. 1, the protected storage areas may include nonvolatile memory blocks 106-1-3 and 106-$n$ of the nonvolatile memory array 104. The embodiments, however, are not limited to the example of FIG. 1.

In various embodiments, the nonvolatile memory array 104 may comprise a plurality of protected status cells 108-1-$n$, where n represents a positive integer value. The protection status cells 108-1-$n$ may comprise, for example, a nonvolatile storage area within the nonvolatile memory array 104. Each of the protected status cells 108-1-$n$ may include a nonvolatile memory cell (e.g., flash memory cell) arranged to store a protected status bit. In one embodiment, each of the protected status cells 108-1-$n$ may comprise a one time programmable (OTP) cell or other unmodifiable nonvolatile storage area that, once programmed, may be locked to prevent further reprogramming.

The protected status cells 108-1 may be programmed to identify one or more of the nonvolatile memory blocks 106-1-$n$ as a protected storage area. The protected status cells 108-1-$n$ may be associated with, or correspond to, a particular group of nonvolatile memory blocks, such as nonvolatile memory blocks 106-1-$n$. In one embodiment, each of the protected status cells 108-1-$n$ may be programmed with a protected status bit (e.g., 1=protected, 0=normal) to identify one or more of the nonvolatile memory blocks 106-1-$n$ as protected storage area. As shown in FIG. 1, each the protected status cells 108-1-3 and 108-$n$ includes protected status bit set to one indicating nonvolatile memory blocks 106-1-3 and 106-$n$ are protected storage areas. The embodiments, however, are not limited to the example of FIG. 1.

In various embodiments, the nonvolatile memory array 104 may comprise a protected key storage area 110. The protected key storage area 110 may be associated with, or correspond to, a particular group of memory blocks, such as memory blocks 106-1-$n$. The protected key storage area 110 may comprise, for example, a nonvolatile storage area within the nonvolatile memory array 104. In one embodiment, the protected key storage area 110 may comprise an OTP storage area that, once programmed, may be locked to prevent further reprogramming.

The protected key storage area 110 may be arranged to be programmed with a security key. In various embodiments, the security key may be used to perform one or more operations on information to be programmed in one or more protected storage areas, such as protected nonvolatile memory blocks 106-1-3 and 106-$n$. The security key may comprise, for example, a public asymmetric key. The security key may include a name or other identification information, an expiration date, a serial number, and/or other information. In various implementations, the security key may be used to perform one or more operations such as encryption, decryption data, digital signature generation, authenticating operations, and so forth.

In various embodiments, the protected security key may be associated with, or correspond to, a particular provider such as an original equipment manufacturer (OEM), an original design manufacturer (ODM), an Over The Air (OTA) third-party vendor (TPV), an independent software vendor (ISV), an independent hardware vendor (IHV), an operating system vendor (OSV), an independent content provider (ICP), a service provider, a chipset provider, a flash memory customer, and so forth. In various implementations, the provider (e.g., OEM) may program the protected status cells 108-1-$n$ and the protected key storage area 110. For example, the provider may program the protection status cells 108-1-$n$ to configure particular nonvolatile memory blocks 106-1-$n$ as protected storage areas and may program the protected key storage area 110 with a public asymmetric key associated with the provider that may be used to perform operations on information to be programmed in the protected storage areas.

The nonvolatile memory 102 may comprise one or more buffers, such as a program buffer 112. The program buffer 112 may comprise, for example, a rewritable nonvolatile storage area within the nonvolatile memory 102 configured to perform buffering of information to be programmed in the nonvolatile memory array 104. In various embodiments, the nonvolatile memory 102 may be arranged to buffer information in the program buffer 112 prior to programming the information in the nonvolatile memory array 104. In various implementations, the program buffer 112 may be arranged to queue multiple items to be programmed in the nonvolatile memory array 104.

The nonvolatile memory 102 may be arranged to transform information that is to be programmed in one or more protected storage areas, such as protected nonvolatile memory blocks 106-1-3 and 106-n. The nonvolatile memory 102 may be arranged, for example, to transform the buffered information in the program buffer 112. In various embodiments, the nonvolatile memory 102 may be arranged to perform a one-way transformation operation, such as a one-way decryption operation. In such embodiments, the nonvolatile memory 102 may perform dynamic or "on-the-fly" one-way decryption of the information in the program buffer 112 during programming of one or more protected storage areas, such as protected nonvolatile memory blocks 106-1-3 and 106-n. In one embodiment, the decryption may comprise Rivest Shamir Adleman (RSA) decryption.

The nonvolatile memory 102 may be arranged to perform the transformation of information using a controller 114 and/ or a transformation block 116. In various embodiments, the controller 114 may comprise, for example, a microcontroller embedded in or integrated with the nonvolatile memory 102, and the nonvolatile memory 102 may comprise instructions and/or code to be executed by the controller 114. In various implementations, the controller 114 may be arranged to perform transformation operations on information to be programmed in the nonvolatile memory array 104, such as buffered information in the program buffer 112.

It can be appreciated that although some embodiments may be described with the controller 114 implemented by a microcontroller, the embodiments are not limited in this context. For example, in some embodiments, the controller 114 may be implemented by a processor such as a general purpose processor, a chip multiprocessor (CMP), a dedicated processor, an embedded processor, a digital signal processor (DSP), a network processor, a media processor, an input/output (I/O) processor, a media access control (MAC) processor, a radio baseband processor, a co-processor, a microprocessor, and so forth. The controller 114 also may be implemented by an application specific integrated circuit (ASIC), a field programmable gate array (FPGA), a programmable logic device (PLD), and so forth.

In various embodiments, the nonvolatile memory 102 may comprise a transformation block 116. The transformation block 116 may be implemented, for example, by hardware and/or software in the nonvolatile memory 102. The transformation block 116 may comprise, for example, instructions and/or code in the nonvolatile memory 102 to be executed by the controller 114. In various implementations, the transformation block 116 may integrate security features such as a decryption protocol directly into the nonvolatile memory 102. As such, the transformation block 116 may implement a hardware mechanism for securing the nonvolatile memory 102 against a virus that attempts to program malicious information to the nonvolatile memory array 104.

The transformation block 116 may comprise logic for transforming information that is to be programmed in one or more protected storage areas. The protected storage areas may comprise, for example, one or more nonvolatile memory blocks 106-1-n of the nonvolatile memory array 104 in the nonvolatile memory 102. The information to be programmed may comprise, for example, information buffered in the program buffer 112.

In various embodiments, transforming may comprise determining the protection status of one or more nonvolatile memory blocks 106-1-n of the memory array 104 and transforming information in the program buffer 112. For example, if the protection status bit for a memory block is set (1=protected), the information buffered in the program buffer 112 may be transformed. If the protection status bit for a memory block is reset (0=normal), the information buffered in the program buffer 112 may be programmed normally to the nonvolatile memory array 104 of the nonvolatile memory 102.

The transformation block 116 may provide a mechanism for performing a one-way transformation of information to be programmed to the nonvolatile memory array 104 of the nonvolatile memory 102. In various embodiments, the transformation block 116 may enforce the one-way transformation on a block granularity. The transformation block 116 may enforce such one-way transformation on all information that is to be programmed to protected storage areas of a nonvolatile memory array 104, effectively eliminating the nonvolatile memory array 104 as an attack point for a virus. In various implementations, the a one-way transformation may comprise a dynamic or "on-the-fly" one-way decryption (e.g., RSA decryption) of information in the program buffer 112 during programming of one or more protected nonvolatile memory blocks, such as protected nonvolatile memory blocks 106-1-3 and 106-n.

In various embodiments, the security key stored in the protected key storage area 110 may used to transform the information to be programmed in one or more protected storage areas, such as protected nonvolatile memory blocks 106-1-3 and 106-n. For example, the information buffered in the program buffer 112 may be transformed using the security key. In some implementations, transforming the buffered information in the program buffer may comprise using a public asymmetric key to perform one-way decrypting of information that previously was encrypted with a private key. In such implementations, the transformed information may include properly decrypted and/or clear information. In some implementations, transforming the buffered information in the program buffer may comprise one-way decrypting improperly encrypted information and/or clear or unencrypted information from a virus. In such implementations, the transformed information may include scrambled, jumbled, unintelligible, and/or meaningless information such as a meaningless byte stream, for example.

By transforming information with a security key (e.g., asymmetric public key) before the information is programmed, the nonvolatile memory array 104 may be protected from attack by a virus attempting to program malicious information. Because the virus will not have a private key for creating an appropriate signature and properly encrypting information, decrypting information using a public key will modify and render malicious information from a virus harmless to the nonvolatile memory array 104.

In various embodiments, the nonvolatile memory 102 may be arranged to require a particular provider (e.g., OEM) to encrypt information to be programmed in one or more protected storage areas, such as protected nonvolatile memory blocks 106-1-3 and **106-*n***. The information from the provider may comprise, for example, software and/or firmware, such as an initial installation of software and/or firmware or an update to previously installed software and/or firmware. The information may include one or more binary images. The binary images may comprise, for example, a pre-compiled set of files (e.g., executables, drivers, data) to load and/or install software and/or firmware. In various implementations, the information from the provider may be segmented into a series of data packets or windows. Each data packet or window may comprise, for example, a discrete data set having a fixed or varying size represented in terms of bits or bytes, such as 1 KB. It can be appreciated that the described embodiments are applicable to any type of communication content or format, such as packets, windows, files, cells, frames, fragments, units, and so forth.

For example, a provider (e.g., OEM) may segment a binary image into a series of packets or windows to be programmed to one or more protected storage areas of the nonvolatile memory 102. Each of the packets or windows may be encrypted with a private key associated with the provider. By transforming each of the packets using the asymmetric public key of the provider before programming, the transformed information to be programmed may include properly decrypted and/or clear information. In some implementations, the provider may append a cyclic redundancy check (CRC) to each packet. In such implementations, the provider may encrypt the packet and/or the CRC with the private key associated with the provider.

The nonvolatile memory 102 may be arranged to program the transformed information. In various embodiments, the nonvolatile memory 102 may be arranged to program the transformed information in the protected storage areas, such as protected nonvolatile memory blocks 106-1-3 and **106-*n*. In some implementations, the transformed information may comprise clear and/or correct information, for example, if the information was encrypted appropriately prior to being buffered in the program buffer 112**. As such, subsequently reading the protected storage areas will obtain the correct information. In some implementations, the transformed information may comprise scrambled, jumbled, unintelligible, and/or meaningless information such as a meaningless byte stream, for example, if the information buffered into the program buffer includes clear data and/or improperly encrypted data from a virus.

By transforming program operations, the nonvolatile memory 102 may be protected against a virus that attempts to write malicious information directly to a protected storage area of the nonvolatile memory 102. For example, if a virus attempts to program malicious information to a protected storage area of the nonvolatile memory 102, the malicious information will be modified by the transformation operation. Because the malicious information is transformed, only meaningless information may be programmed, and the nonvolatile memory 102 will be protected.

In various embodiments, the transformation block 116 may comprise part of a file system manager 118 of the nonvolatile memory 102. The file system manager 118 may be implemented, for example, by instructions and/or code stored in the nonvolatile memory 102. In various embodiments, the file system manager 118 may comprise logic to manage and store information in the nonvolatile memory 102. The file system manager 118 may be arranged to issue read, write, and erase commands for the nonvolatile memory 102 and to translate file system volumes into memory arrays. In various implementations, the file system manager 118 may provide one or more interfaces between the hardware of the nonvolatile memory 102 and a client application and/or an operating system (OS), such as a real-time operating system (RTOS).

In various embodiments, the file system manager 118 may comprise instructions and/or code to be executed by the controller 114. In some embodiments, the controller 114 may be arranged to perform various operations for managing and storing information in the nonvolatile memory 102. The operations performed by the controller 114 may comprise, for example, standard operations such as read, program, and erase operations. The controller 114 also may be arranged to perform operations to increase and/or optimize system performance. For example, the controller 114 may allow some operations to be performed simultaneously, such as reading and executing code while programming data. The controller 114 also may allow some operations to be suspended and resumed. The controller 114 may perform various operations in one or more modes such as an asynchronous mode, synchronous mode, word mode, page mode, and burst mode, for example.

In various embodiments, the file system manager 118 may comprise an authentication block 120. The authentication block 120 may be implemented, for example, by hardware and/or software in the nonvolatile memory 102. The authentication block 120 may comprise, for example, instructions and/or code to be executed by the controller 114. In various implementations, the authentication block 120 may integrate security features such authenticated operations directly into the nonvolatile memory 102.

In various implementations, the authentication block 120 may provide the nonvolatile memory 102 with the capability to internally authenticate certain operations for further protection against malicious or inadvertent modifications. For example, if a requested operation passes authentication, the nonvolatile memory 102 will perform the requested operation. If the requested operation does not pass authentication, the nonvolatile memory 102 will not perform the requested operation.

The authentication block 120 may comprise logic for providing a series of authenticated operations such as authenticated read, authenticated write, authenticated patch, and authenticated key operations. In various embodiments, the controller 114 may manage the operation of the authentication block 120. As shown, the authentication block 120 may comprise one or mechanisms for authenticating a requested operation, such as a random number generator (RNG) block 122, a secure hash generator (SHA) block 124, a RSA block 126, and a secure key storage (SKS) block 128. In various implementations, the RNG block 122, the SHA block 124, and the RSA block 126 may be used, for example, to verify a digital signature and/or a hash value and to perform encryption and/or decryption. The SKS block 128 may be used to store security key, such as an asymmetric pubic key.

In various embodiments, the nonvolatile memory 102 may be arranged to transform information to be programmed in one or more protected storage areas in conjunction with, or as part of, performing authenticated operations. In one embodiment, for example, the authentication block 120 may be arranged to transform (e.g., decrypt) the buffered information in the program buffer 112 using the RSA 126 and a security key stored in the SKS block 128.

In various embodiments, the nonvolatile memory 102 may be arranged to receive information from a processor 130, such as a central processing unit (CPU), for example. In various embodiments, the controller 114 may perform one or more operations in nonvolatile memory 102 in response to information received from the processor 130. As shown, the processor 130 may comprise a discrete component separate from and coupled to the nonvolatile memory 102. In various implementations, the nonvolatile memory 102 may store instructions and/or code to be executed by the processor 130.

The processor 130 generally may be implemented using any processor or logic device. In various embodiments, the processor 130 may be implemented as a general purpose processor, a CMP, a dedicated processor, an embedded processor, a DSP, a network processor, a media processor, an I/O processor, a MAC processor, a radio baseband processor, a co-processor, a microprocessor, a controller, a microcontroller, an ASIC, a FPGA, a PLD, and so forth. In various implementations, the processor 130 may include at least one core comprising, for example, an arithmetic-logic unit (ALU) and a number of registers. The core may be arranged to execute digital logic and may provide for multiple threads of execution.

In various embodiments, the nonvolatile memory 102 may be arranged to receive information over one or more communications media 132. The communications media 132 generally may comprise any medium capable of carrying information signals such as wired communication media, wireless communication media, or a combination of both, as desired for a given implementation. The communications media 132 may comprise, for example, wired communication media such as a bus to interconnect various functional units of the computing system 100. Other examples of wired communications media may include a wire, a cable, a printed circuit board (PCB), a backplane, a switch fabric, semiconductor material, twisted-pair wire, co-axial cable, fiber optics, and so forth. An example of wireless communication media may include portions of a wireless spectrum, such as the radio-frequency (RF) spectrum. The embodiments are not limited in this context.

In various embodiments, the nonvolatile memory 102 may be arranged to receive information through a communications interface 134. The communications interface 134 may comprises any suitable hardware, software, or combination of hardware and software that is capable of coupling the computing system 100 to one or more networks and/or network devices. The communications interface 134 may be arranged to operate with any suitable technique for controlling information signals using a desired set of communications protocols, services or operating procedures. The communications interface 134 may include the appropriate physical connectors to connect with a corresponding communications medium.

In various embodiments, the communications interface 134 may comprise one or more interfaces such as, for example, a wireless communications interface, a wired communications interface, a network interface, a transmit interface, a receive interface, a media interface, a system interface, a component interface, a switching interface, a chip interface, a controller (e.g., disc controller, video controller, audio controller), and so forth. When implemented by a wireless device or wireless system, for example, the computing system 100 may include a wireless interface comprising one or more antennas, transmitters, receivers, transceivers, amplifiers, filters, control logic, and so forth.

Figure 2A:
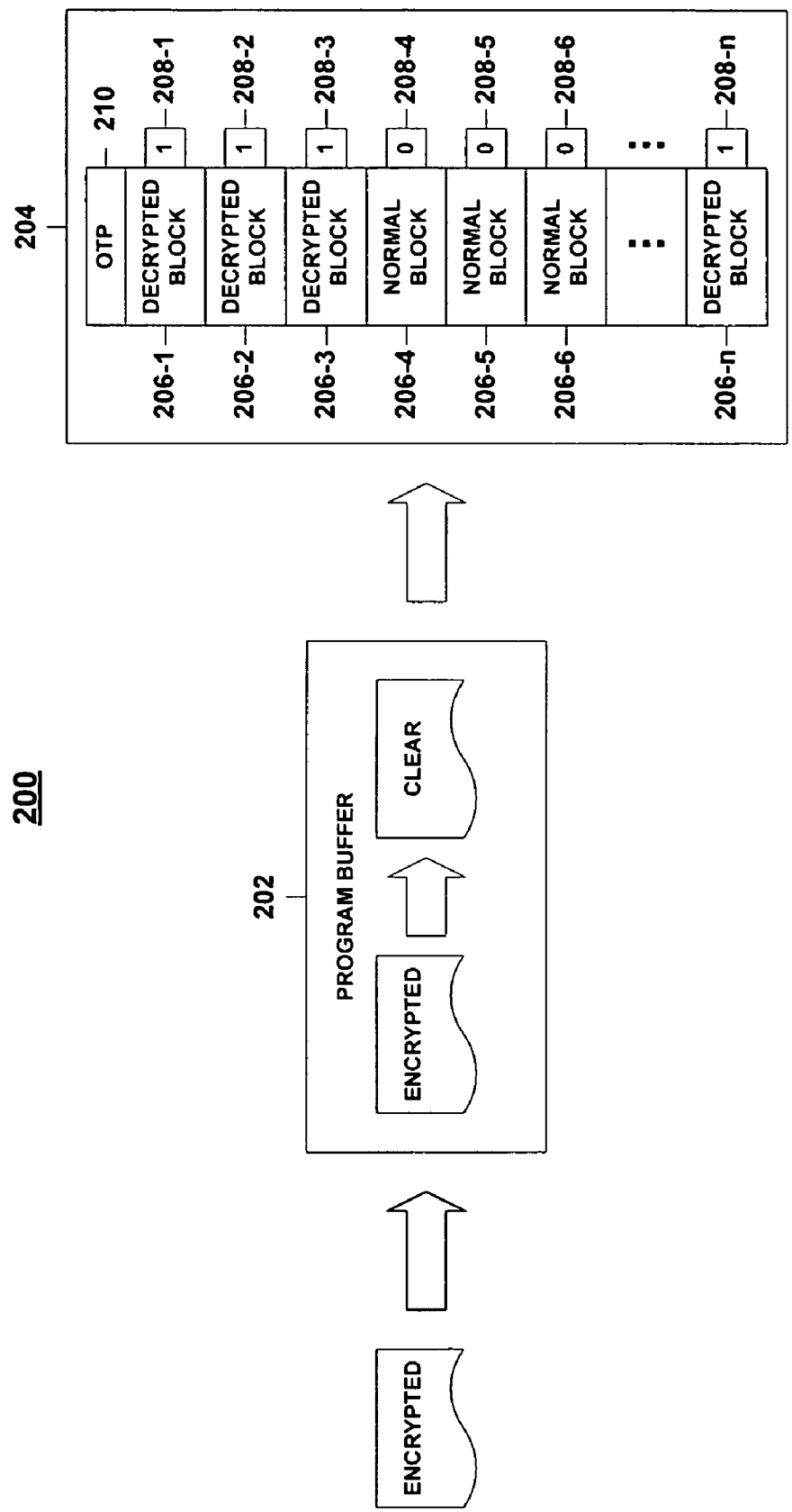
FIGS. 2A-C illustrate one embodiment of a nonvolatile memory.
Figure 2B:
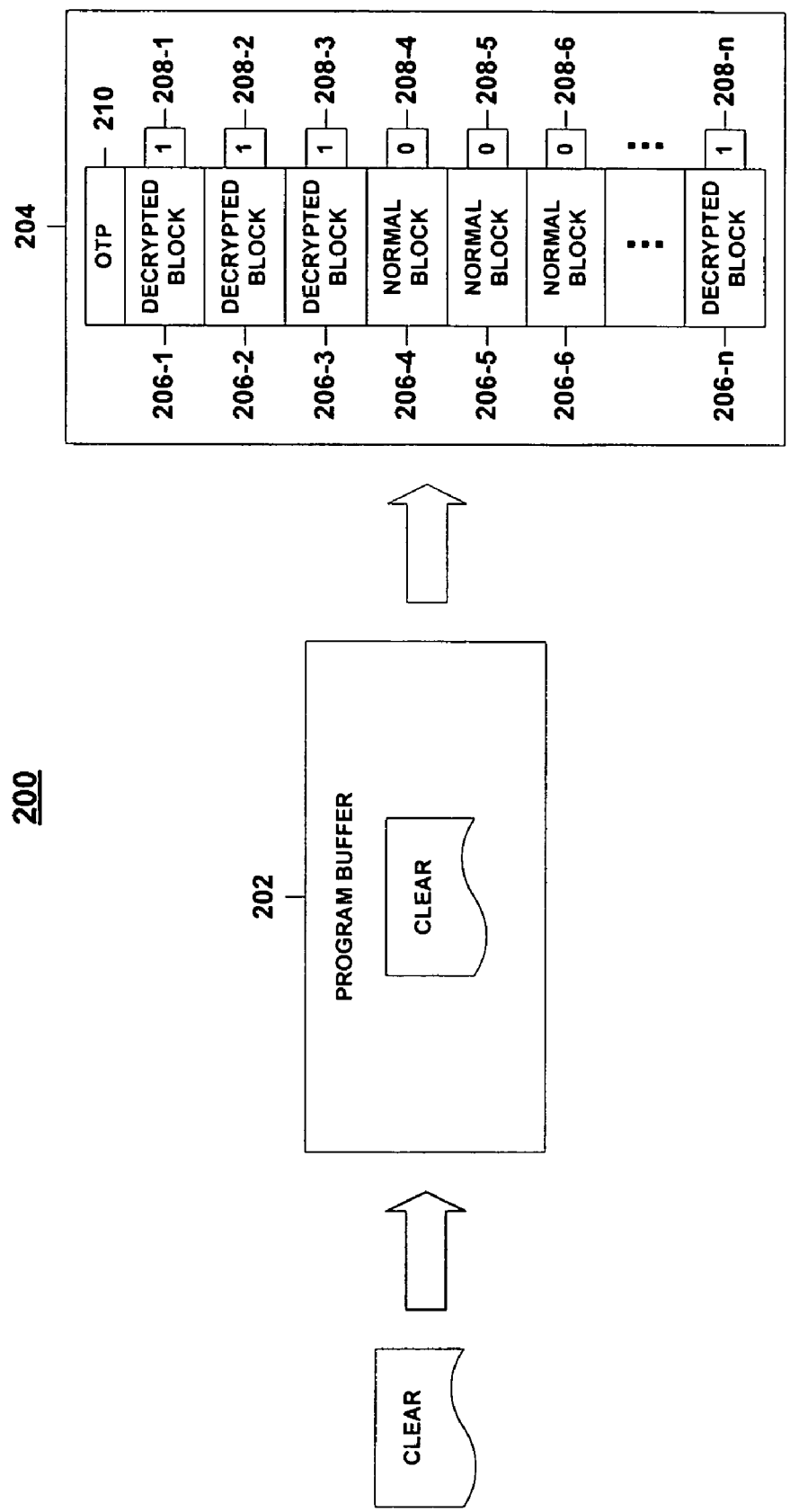
Figure 2C:
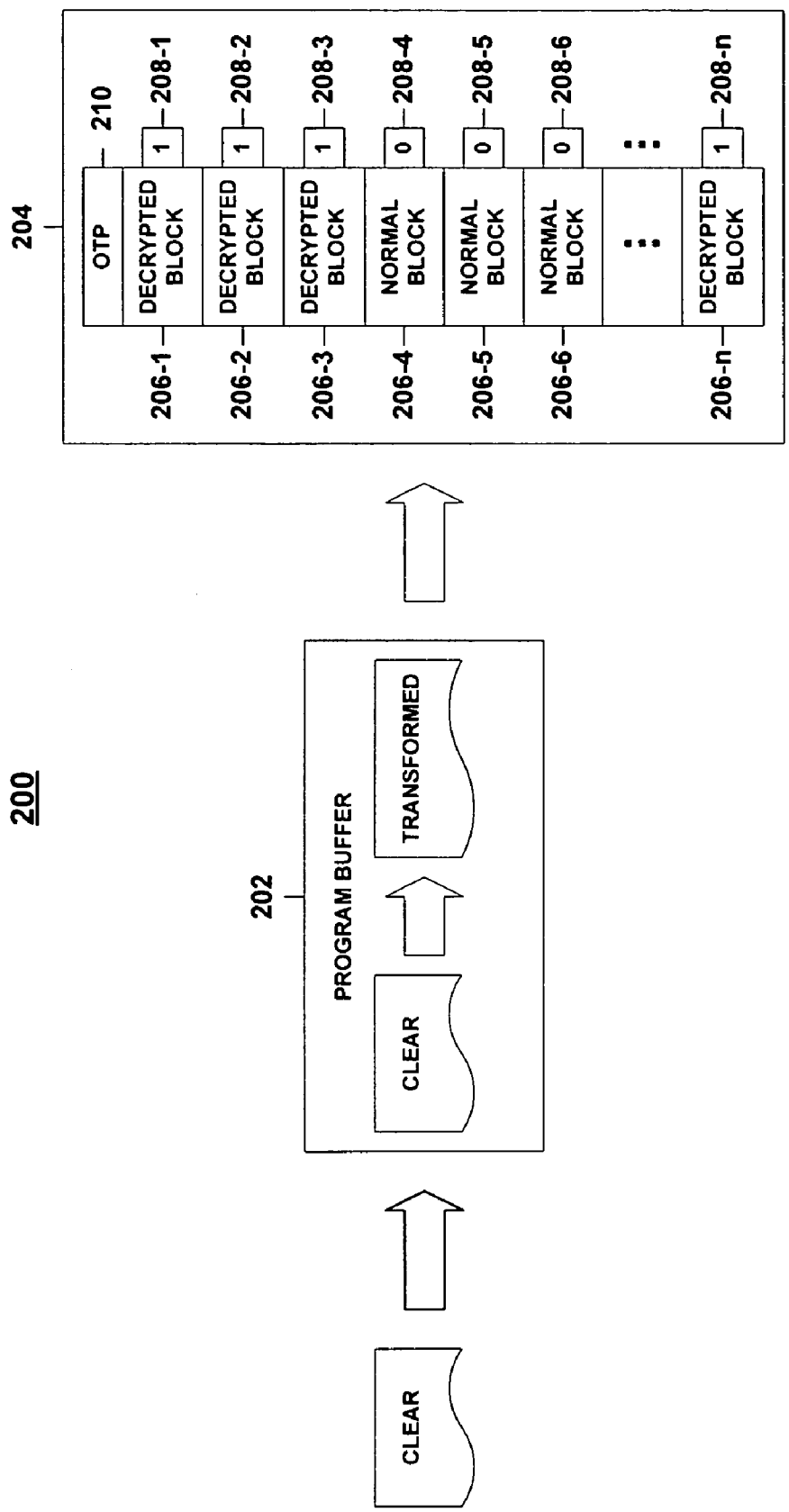

FIGS. 2A-C illustrate one embodiment of a nonvolatile memory 200. In various embodiments, the memory 200 may be implemented as the nonvolatile memory 102 of FIG. 1. The embodiments, however, are not limited in this context.

In various embodiments, the nonvolatile memory 200 may include features to provide protection against malicious attempts by a virus to modify the nonvolatile memory 200. Such features may comprise, or be implemented by, hardware, software, and/or any combination thereof, as desired for a given set of design parameters or performance constraints.

As shown, the nonvolatile memory 200 may comprise a program buffer 202 and a nonvolatile memory array 204. In various embodiments, the nonvolatile memory 200 may be arranged to buffer information in the program buffer 202 prior to programming the information in the nonvolatile memory array 204.

The nonvolatile memory 200 may comprise one or more protected storage areas. In one embodiment, the protected storage areas may comprise one or more nonvolatile memory blocks 206-1-$n$ of the nonvolatile memory array 204. As shown in FIG. 2, the protected storage areas may include nonvolatile memory blocks 206-1-3 and 106-$n$ of the nonvolatile memory array 204. The embodiments, however, are not limited to the example of FIG. 2.

The nonvolatile memory array 204 may comprise a plurality of protected status cells 208-1-$n$, where n represents a positive integer value. In various embodiments, the protected status cells 208-1 may be programmed to identify one or more of the nonvolatile memory blocks 206-1-$n$ as a protected storage area. As shown in FIG. 2, each the protected status cells 208-1-3 and 208-$n$ includes protected status bit set to one indicating nonvolatile memory blocks 206-1-3 and 206-$n$ are protected storage areas. The embodiments, however, are not limited to the example of FIG. 2.

The nonvolatile memory array 204 may comprise a protected key storage area 210. In various embodiments, the protected key storage area 210 may be arranged to be programmed with a security key. The security key may comprise, for example, a public asymmetric key to be used to transform (e.g., decrypt) information buffered in the program buffer 202.

The nonvolatile memory 200 may be arranged to determine the protection status of on or more nonvolatile memory blocks 206-1-$n$ of the memory array 204. If the protection status bit is set (1=protected), the nonvolatile memory 200 may perform transformation of the information in the program buffer 202. If the protection status bit is reset (0=normal), the nonvolatile memory 200 may perform a normal programming operation.

The nonvolatile memory 200 may be arranged to transform information that is to be programmed in one or more of the protected nonvolatile memory blocks 206-1-3 and 206-$n$. The nonvolatile memory 200 may be arranged, for example, to transform the buffered information in the program buffer 202. In various embodiments, the nonvolatile memory 200 may be arranged to perform a one-way transformation operation, such as a one-way decryption operation. In such embodiments, the nonvolatile memory 200 may perform dynamic or "on-the-fly" one-way decryption of the information in the program buffer 202 during programming of the protected nonvolatile memory blocks 206-1-3 and 206-$n$.

Referring to FIG. 2A, the program buffer 202 may receive encrypted information to be programmed in one of the protected nonvolatile memory blocks 206-1-3 and 206-$n$. The nonvolatile memory 200 may be arranged to perform a one-way transformation operation, such as a one-way decryption operation, on the encrypted information buffered in the program buffer 202. In various embodiments, the transformation operation may be performed using the security key programmed in the protected key storage area 210. If the information was encrypted appropriately prior to being buffered in the program buffer 202, the result of the transformation is clear information to be programmed in one of the protected nonvolatile memory blocks 206-1-3 and 206-$n$. As such, subsequently reading one of the protected nonvolatile memory blocks 206-1-3 and 206-n will obtain the correct information.

Referring to FIG. 2B, the program buffer 202 may receive clear information to be programmed in one of the normal (e.g., unprotected) nonvolatile memory blocks 206-4-6. The nonvolatile memory 200 may be arranged to perform normal programming and to store the clear information in one of the normal nonvolatile memory blocks 206-4-6.

Referring to FIG. 2C, the program buffer 202 may receive clear information from a virus to be programmed in one of the protected nonvolatile memory blocks 206-1-3 and 206-n. The nonvolatile memory 200 may be arranged to perform a one-way transformation operation, such as a one-way decryption operation, on the encrypted information buffered in the program buffer 202. In various embodiments, the transformation operation may be performed using the security key programmed in the protected key storage area 210. Because the information buffered into the program buffer included clear data, the result of the transformation is scrambled, jumbled, unintelligible, and/or meaningless information to be programmed in one of the protected nonvolatile memory blocks 206-1-3 and 206-n. Accordingly, the nonvolatile memory 200 may provide protection against malicious attempts by a virus to modify the nonvolatile memory 200.

Operations for various embodiments may be further described with reference to the following figures and accompanying examples. Some of the figures may include a logic flow. It can be appreciated that the logic flow merely provides one example of how the described functionality may be implemented. Further, the given logic flow does not necessarily have to be executed in the order presented unless otherwise indicated. In addition, the logic flow may be implemented by a hardware element, a software element executed by a processor, or any combination thereof. The embodiments are not limited in this context.

Figure 3:
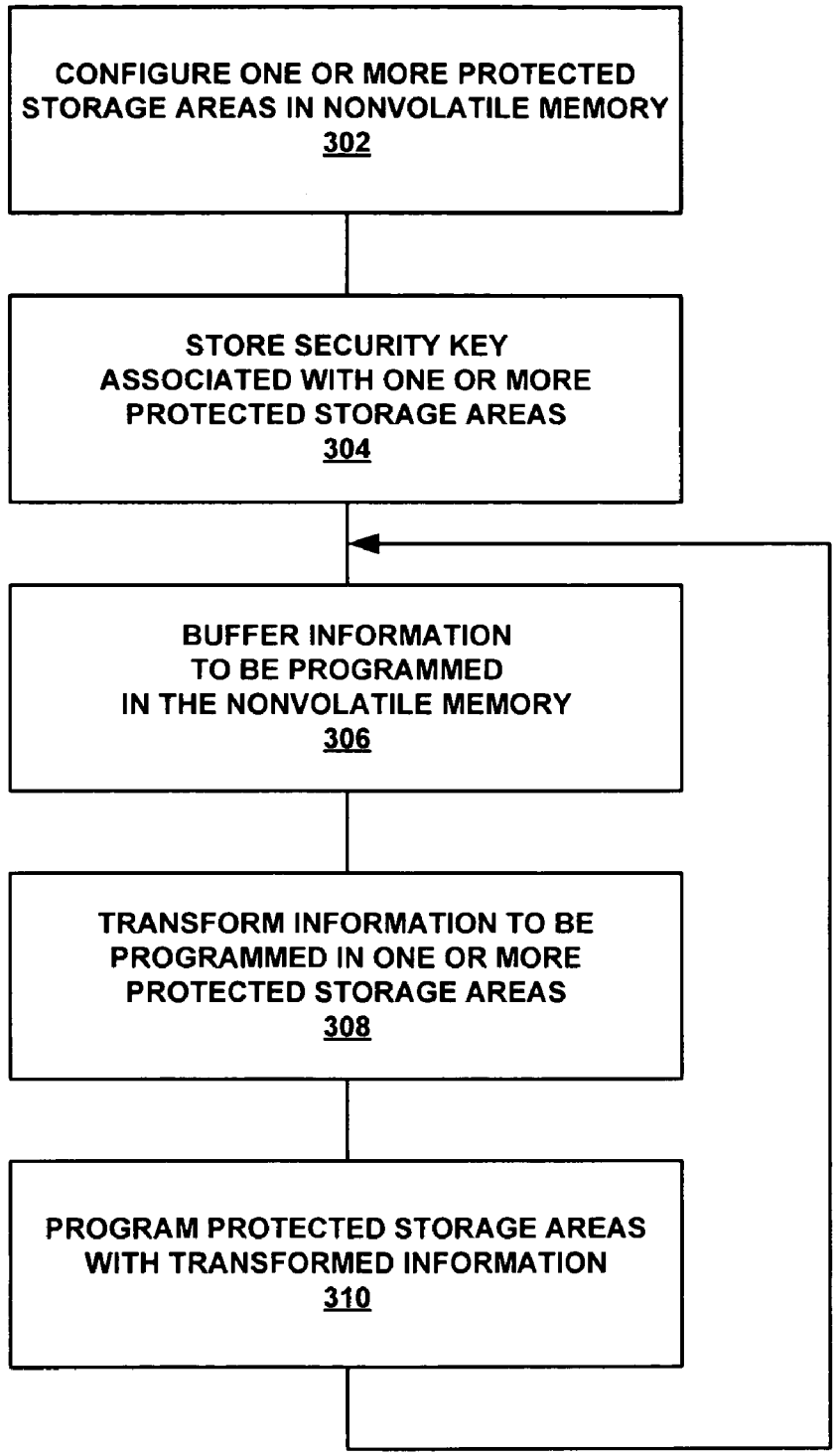
FIG. 3 illustrates one embodiment of a logic flow.

FIG. 3 illustrates one embodiment of a logic flow 300. FIG. 3 illustrates logic flow 300 for protecting nonvolatile memory. In various embodiments, the logic flow 300 may provide protection against malicious attempts by a virus to modify the nonvolatile memory. The logic flow 300 may be implemented, for example, by one or more elements of the computing a system 100 of FIG. 1 and/or the nonvolatile memory 200 of FIG. 2A-C. It can be appreciated that the logic flow 300 may be implemented by various other types of hardware, software, and/or combination thereof.

The logic flow 300 may comprise configuring one or more protected storage areas in a nonvolatile memory (block 302). In various embodiments, the protected storage areas may comprise one or more nonvolatile memory blocks of a nonvolatile memory array in the nonvolatile memory. Configuring a protected storage area may comprise, for example, programming a protected status cell to identify a nonvolatile memory block as a protected storage area. Programming a protected status cell may comprise setting a protected status bit set to indicate that a nonvolatile memory block associated with the protected status cell is a protected storage area.

The logic flow 300 may comprise storing a security key associated with the one or more protected storage areas (block 304). In various embodiments, the security key may comprise a public asymmetric key to be used to transform (e.g., decrypt) information. Storing the security key may comprise, for example, programming the security key in a protected key storage area of a nonvolatile memory array.

The logic flow 300 may comprise buffering information to be programmed in the nonvolatile memory (block 306). In various embodiments, the nonvolatile memory may comprise a program buffer arranged to buffer information prior to programming the information in a nonvolatile memory array.

The logic flow 300 may comprise transforming information to be programmed in one or more protected storage areas (block 308). In various embodiments, the protected storage areas may comprise one or more nonvolatile memory blocks of a nonvolatile memory array in the nonvolatile memory. The information to be programmed may comprise information buffered in a program buffer. Transforming may comprise, for example, determining the protection status of one or more nonvolatile memory blocks of a memory array and performing transformation of information in a program buffer if the information is to be programmed in a protected nonvolatile memory block. Transforming may comprise performing a one-way transformation operation, such as performing dynamic or "on-the-fly" one-way decryption of information in a program buffer during programming of a protected nonvolatile memory block.

The logic flow 300 may comprise programming one or more protected storage areas with transformed information (block 310). The transformed information may comprise clear and/or correct information if the information was encrypted appropriately prior to being buffered in the program buffer. As such, subsequently reading the protected storage areas will obtain the correct information. The transformed information may comprise scrambled, jumbled, unintelligible, and/or meaningless information if the information buffered into the program buffer includes clear data and/or improperly encrypted data from a virus, for example. As shown, the logic flow 300 may comprise repeating the buffering of information (block 306), the transforming of information (block 308), and the programming of transformed information (block 310). The embodiments, however, are not limited in this context.

In various implementations, the described embodiments may comprise, or form part of a wired communication system, a wireless communication system, or a combination of both. Although certain embodiments may be illustrated using a particular communications media by way of example, it may be appreciated that the principles and techniques discussed herein may be implemented using various communication media and accompanying technology.

In various implementations, the described embodiments may comprise or form part of a network, such as a Wide Area Network (WAN), a Local Area Network (LAN), a Metropolitan Area Network (MAN), a wireless WAN (WWAN), a wireless LAN (WLAN), a wireless MAN (WMAN), a wireless personal area network (WPAN), a WiMAX network, a broadband wireless access (BWA) network, the Internet, the World Wide Web, a telephone network, a radio network, a television network, a cable network, a satellite network, a Code Division Multiple Access (CDMA) network, a third generation (3G) network such as Wide-band CDMA (WCDMA), a fourth generation (4G) network, a Time Division Multiple Access (TDMA) network, an Extended-TDMA (E-TDMA) cellular radiotelephone network, a Global System for Mobile Communications (GSM) network, a Synchronous Division Multiple Access (SDMA) network, a Time Division Synchronous CDMA (TD-SCDMA) network, an Orthogonal Frequency Division Multiplexing (OFDM) network, an Orthogonal Frequency Division Multiple Access (OFDMA) network, a North American Digital Cellular (NADC) cellular radiotelephone network, a Narrowband Advanced Mobile Phone Service (NAMPS) network, a Universal Mobile Telephone System (UMTS) network, and/or any other wired or wireless communications network configured to carry data.

In various implementations, the described embodiments may be arranged to communicate using a number of different WWAN data communication services. Examples of cellular data communication systems offering WWAN data communication services may include a GSM with General Packet Radio Service (GPRS) systems (GSM/GPRS), CDMA/1× RTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, and so forth.

In various implementations, the described embodiments may be arranged to communicate in accordance with a number of wireless protocols. Examples of wireless protocols may include various WLAN protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may include various WWAN protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may include WPAN protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Other examples of wireless protocols may include near-field communication techniques and protocols, such as electromagnetic induction (EMI) techniques. An example of EMI techniques may include passive or active radio-frequency identification (RFID) protocols and devices. Other suitable protocols may include Ultra Wide Band (UWB), Digital Office (DO), Digital Home, Trusted Platform Module (TPM), ZigBee, and other protocols.

In various implementations, the described embodiments may employ one or more protocols such as medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), and so forth.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an ASIC, PLD or DSP, and so forth. In yet another example, an embodiment may be implemented by any combination of programmed general-purpose computer components and custom hardware components.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus comprising:
a nonvolatile memory comprising one or more protected storage areas, said nonvolatile memory to transform buffered information to be programmed in said one or more protected areas and to program transformed information in said one or more protected storage areas;
wherein said transformed information comprises scrambled information if said buffered information comprises clear information from a virus.

2. The apparatus of claim 1, said nonvolatile memory comprising at least one nonvolatile array including said one or more protected storage areas and a program buffer to buffer information to be programmed in said nonvolatile memory array.

3. The apparatus of claim 1, said nonvolatile memory comprising at least one protected status cell, said at least one protected status cell to store a status bit identifying a protected storage area.

4. The apparatus of claim 1, said nonvolatile memory to transform said buffered information by performing a one-way decryption operation.

5. A system comprising:
a wireless interface comprising an antenna; and
a nonvolatile memory coupled to said wireless interface, said nonvolatile memory comprising one or more protected storage areas, said nonvolatile memory to transform buffered information to be programmed in said one or more protected areas and to program transformed information in said one or more protected storage areas;
wherein said transformed information comprises scrambled information if said buffered information comprises clear information from a virus.

6. The system of claim 5, said nonvolatile memory comprising at least one nonvolatile array including said one or more protected storage areas and a program buffer to buffer information to be programmed in said nonvolatile memory array.

7. The system of claim 5, said nonvolatile memory comprising at least one protected status cell, said at least one protected status cell to store a status bit identifying a protected storage area.

8. The system of claim 5, said nonvolatile memory to transform said buffered information by performing a one-way decryption operation.

9. A method, comprising:
transforming buffered information to be programmed in one or more protected areas of a nonvolatile memory;
programming transformed information in said one or more protected storage areas;
buffering clear information from a virus; and
transforming said clear information into scrambled information.

10. The method of claim 9, further comprising configuring said one or more protected storage areas in said nonvolatile memory.

11. The method of claim 9, further comprising:
storing a security key associated with said one or more protected storage areas; and
transforming said buffered information with said security key.

12. The method of claim 9, further comprising performing a one-way decryption operation.

13. An article comprising a machine-readable storage medium containing instructions that if executed enable a system to:
transform buffered information to be programmed in one or more protected areas of a nonvolatile memory;
program transformed information in said one or more protected storage areas;
buffer clear information from a virus; and
transform said clear information into scrambled information.

14. The article of claim 13, further comprising instructions that if executed enable a system to configure said one or more protected storage areas in said nonvolatile memory.

15. The article of claim 13, further comprising instructions that if executed enable a system to store a security key associated with said one or more protected storage areas; and to transform said buffered information with said security key.

16. The article of claim 13, further comprising instructions that if executed enable a system to perform a one-way decryption operation.

* * * * *